UNITED STATES PATENT OFFICE.

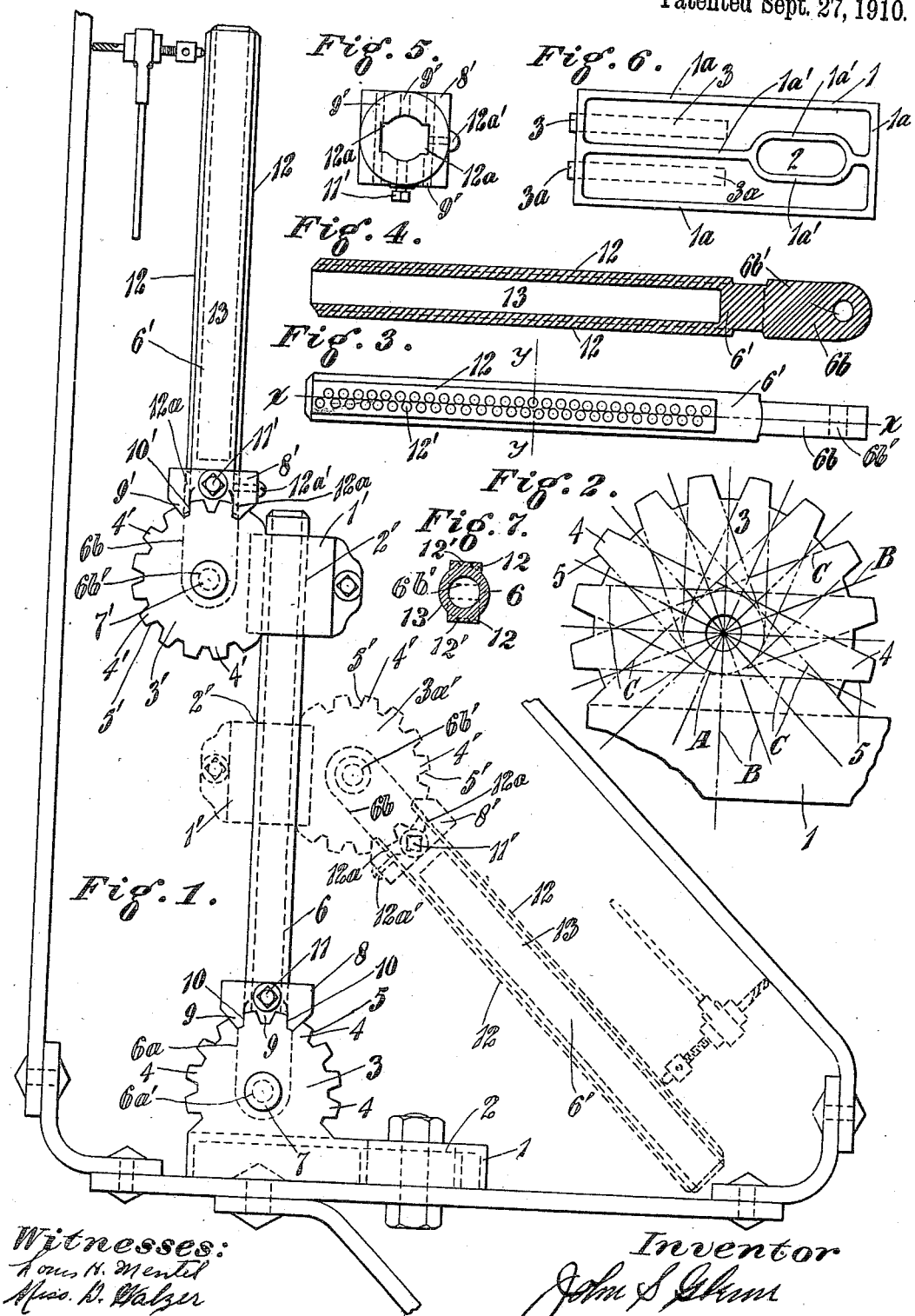

JOHN S. GLENN, OF WEST COVINGTON, KENTUCKY.

DRILL-BRACE.

971,037.  Specification of Letters Patent.  Patented Sept. 27, 1910.

Application filed July 3, 1909. Serial No. 505,894.

*To all whom it may concern:*

Be it known that I, JOHN S. GLENN, a citizen of the United States, residing at West Covington, in the county of Kenton and State of Kentucky, have invented certain new and useful Improvements in Drill-Braces, of which the following is a specification.

My invention relates to drill braces, and the object is to add to the ease of operation of the parts in adjustment of the brace to various positions and to provide a structure that will combine rigidity with lightness, especial reference being had to my Patent No. 917,048, granted April 6, 1909.

My invention consists in the improved arrangement of the teeth in the segments and the detents, as well as in the other details of construction and arrangement of parts as will hereinafter be more fully described and claimed.

In the drawings: Figure 1 is a side elevation of a drill brace embodying my improvements, the dotted lines indicating an additional adjustment. Fig. 2 is an enlarged diagrammatic side elevation of one of the segments, illustrating the manner in which the teeth are laid out. Fig. 3 is a plan view of the arm, and Fig. 4 is a longitudinal section on the line $x$—$x$ of Fig. 3. Fig. 5 is a plan view of the detent for the arm. Fig. 6 is a bottom plan view of the base. Fig. 7 is a cross section through the arm on the line $y$—$y$ of Fig. 3.

The drill brace illustrated as an example of the embodiment of my improvement comprises the base 1 having a slot 2 through which the tool may be clamped to the work, as is best shown in Fig. 1 of the drawing.
Mounted on the base 1, and integral with it, are the segments 3 and 3ª, concentric to each other and having central openings. These segments are provided with teeth 4, the teeth of each segment being in alinement with those of the other; these teeth have their sides 5 converging toward their ends, so that the spaces or notches between the teeth have sides diverging outwardly of the segment, as will hereinafter be more fully set forth. A standard 6 is pivoted concentric to the segments 3 and 3ª, between them, by means of a pin 7 passing transversely through the head 6ª of the standard, which has an opening 6ª′ to allow the pin to pass through. A detent 8 is slidably mounted on the standard above the segment and has teeth 9 the sides 10 of which are so inclined as to engage with the sides 5 of the teeth 4 on the segments, so that the teeth 9 thus coöperate with the teeth 4 to hold the standard 6 in various adjusted positions, as the teeth 9 engage with different teeth on the segments. Above the detent 8 a head 1′ is slidably mounted on the standard 6, having an opening 2′ through which the standard 6 extends. This head may be clamped to the standard as set forth in my former patent, above referred to, and has segments 3′ and 3ª′, similar to the segments 3 and 3ª on the base 1, with teeth 4′ having outwardly converging sides 5′. An arm 6′ is pivoted concentric to the segments 3′ and 3ª′, between them, by means of a pin 7′ passing through the head 6ᵇ of the arm, which has a transverse opening 6ᵇ′ to allow the pin to pass through. Above the head a detent 8′ is slidably mounted on the arm 6′, and has teeth 9′ the sides 10′ of which are so inclined as to engage with the sides 5′ of the teeth 4′ on the segments 3′ and 3ª′, so that the teeth 9′ thus coöperate with the teeth 4′ to hold the arm 6′ in various adjusted positions, in the same manner as the standard 6 is held in various positions on the base 1. It will be understood that the purpose of thus providing the base, standard and arm adjustable with respect to each other is to allow the arm to be thrown into various positions desired for using it as a support for a drill stock in drilling work too cumbersome to be taken to a drill press, while the base is clamped to the work.

To present a surface for the engagement of the drill stock at various points along the arm 6′ the arm is provided with a longitudinal rib 12 on its lower side, and is also provided with another such rib 12 on its upper side, so that it is not necessary to remove the arm 6′ along with the head 1′ and turn them over in order to utilize the adjustment afforded for drilling upward, as is best illustrated by the dotted lines in Fig. 1 of the drawing. These ribs 12 present plane surfaces, which, to prevent the slipping of the drill stock, are provided with sockets 12′ to receive the end of the stock as illustrated in Fig. 3 of the drawing. By providing the ribs 12 the extension of the arm from its head 6ᵇ is strengthened, and the interior of the arm may be hollow, so that the arm may be light in proportion to its strength, as is desirable in a portable tool. At the same time, the head 6$^b$ of the arm is left solid to afford the maximum strength nearest the support of the arm on the pin 7′ and to afford ample bearing area on the pin inside the transverse opening 6$^{b\prime}$ in the head.

The detent 8′ is provided with recesses 12$^a$ to pass over the ribs 12 on the arm, and these ribs terminate adjacent to the segments 3′ and 3$^{a\prime}$, sufficiently far from the head 6$^b$ of the arm to allow the detent with a screw 12$^{a\prime}$ extending into one of its recesses 12$^a$, to slide up and disengage its teeth 9′ from the teeth 4′ of the segments, before the screw engages with the termination of the rib. This engagement of the screw 12$^{a\prime}$ with the termination of the rib 12 prevents the withdrawal of the detent from the arm. The detents 8 and 8′ are provided with set screws 11 and 11′, respectively, to clamp them in stationary position when engaged with the segments.

The essential requirement in the construction of a drill brace is that it shall be rigid, and thus insure the accurate operation of the drill. However, when the brace is to be adjustable, it is important that the disengagement and engagement of the parts in adjustment shall be readily accomplished.
Where the segments and detents are used, it is desirable that the teeth be as numerous as is consistent with ample strength of the teeth, so that a large number of adjustments may be made. Such a result is attained when all the teeth on the detent engage closely on both sides with the sides of the teeth on the segment. This is attained in my present invention by laying out the teeth of the segments so that each two adjacent teeth, although having their adjacent sides diverging outwardly of the segment, have their other sides parallel, and by providing the detents with teeth which are complements of the teeth in the segments, two, located at the sides of the detent, having their inner adjacent sides parallel and spaced at such a distance apart as to slide freely over the parallel sides of the teeth on the segment, but to fit accurately thereagainst. A third tooth of the detent is located midway between the other two and fits accurately into the space or notch between the adjacent diverging sides of the teeth on the segment. It will also be noted that the outer sides of the outer teeth on the detent will fit against the inclined sides of flanking teeth on the segment. Thus the strength of three teeth on the segment and three teeth on the detent is opposed to the movement of the member that is held in adjusted position by the engagement of the detent with the segment. The laying out of the teeth in accordance with the above requirements in such a manner as to render the engagement of the teeth of the detent and those of the segment uniform throughout the range of adjustment which they afford, is accomplished in a simple manner according to the diagrammatic illustration in Fig. 2 of the drawing, where a circle A of diameter equal to the distance assumed between the desired parallel sides of the adjacent teeth of the segment is inscribed concentric to the segment; then diametrical lines B are drawn through uniformly spaced points around the arc of the segment to mark the locations of the centers of the spaces or notches between the teeth, and lines C are drawn tangent to the circle A and parallel to the lines B, marking the sides of the teeth. The bottoms of the spaces or notches between the teeth are marked by an inscribed arc, as is usual in laying out teeth for gear wheels and the like.

In many instances an obstruction is present where it is desired to locate the base of the drill brace, such as the rivet head indicated in Fig. 1 of the drawing. For this reason, and to render the base 1 as light as is consistent with the required strength, the base is made hollow on its lower side, having the flange 1$^a$ around its sides and a rib 1$^{a\prime}$ extending longitudinally of it in its middle and around the slot 2, as is best shown in Fig. 6 of the drawing.

Having fully described my invention, what I claim as new and desire to secure by Letters Patent is:

1. A drill brace having an adjustable member and a segment concentric to which the member is pivoted, and a detent slidable on the member to engage with the segment and hold the member in adjusted positions, teeth on the segment, each two adjacent of which have adjacent sides diverging and other sides parallel, and teeth on the detent to correspond and coöperate with the teeth on the segment, substantially as and for the purposes specified.

2. In a drill brace, as an improved article of manufacture, the combination with a segment having a central opening, of an adjustable member comprising a solid head with a transverse opening therein and a tubular extension with a longitudinal rib thereon presenting a surface for the engagement of a drill stock, and a pin passing through the opening in the segment and the transverse opening in the solid head of the adjustable member, said solid head affording a bearing for the member on the pin and said longitudinal rib reinforcing the extension of the member, whereby said extension may be tubular, as herein set forth.

3. In a drill brace, as an improved article of manufacture, the combination with a segment having a central opening, of an adjustable member comprising a tubular extension with a longitudinal rib reinforcing it and presenting a surface for the engagement of a drill stock, and a detent slidable on the member, embracing it and having a recess to pass over the rib thereon, said detent being adapted to engage with the segment to hold the member in adjusted positions, and said rib on the tubular extension terminating adjacent to the segment, and engaging means inserted into the recess to engage with the termination of the rib, whereby said rib forms a step to limit the movement of the detent away from the segment, as herein set forth.

JOHN S. GLENN.

Witnesses:
CLARENCE PEIDEN,
LOUIS H. MENTEL.